United States Patent [19]
Genske et al.

[11] Patent Number: 5,160,767
[45] Date of Patent: Nov. 3, 1992

[54] PEELABLE PACKAGING AND SHEET MATERIALS AND COMPOSITIONS FOR USE THEREIN

[75] Inventors: Roger P. Genske, Neenah; Frank Bauer, Appleton, both of Wis.

[73] Assignee: American National Can Company, Chicago, Ill.

[21] Appl. No.: 595,694

[22] Filed: Oct. 4, 1990

Related U.S. Application Data

[60] Continuation of Ser. No. 206,077, Jun. 13, 1988, abandoned, which is a division of Ser. No. 45,003, Apr. 30, 1987, Pat. No. 4,937,139.

[51] Int. Cl.$^5$ ............................................. B29D 22/00
[52] U.S. Cl. ...................... 428/35.98; 215/261; 428/367; 428/349; 428/461; 428/516
[58] Field of Search ............... 428/349, 35.9, 516, 428/36.7, 461; 215/261

[56] References Cited

U.S. PATENT DOCUMENTS

| | | | |
|---|---|---|---|
| 3,358,053 | 12/1967 | Hostetler | 260/876 |
| 3,937,758 | 2/1976 | Castagna | 260/876 |
| 4,336,212 | 6/1982 | Yoshimura et al. | 264/22 |
| 4,438,850 | 3/1984 | Kahn | 206/634 |
| 4,487,871 | 12/1984 | Ishibashi et al. | 524/100 |
| 4,501,798 | 2/1985 | Koschak et al. | 428/475.8 |
| 4,578,316 | 3/1986 | Clauson et al. | 428/516 |
| 4,622,193 | 11/1986 | Kresge et al. | 264/141 |
| 4,656,068 | 4/1987 | Raines | 428/516 |
| 4,666,778 | 5/1987 | Hwo | 428/516 |
| 4,689,099 | 8/1987 | Ito et al. | 156/69 |
| 4,735,855 | 4/1988 | Wofford et al. | 428/475.8 |
| 4,769,261 | 9/1988 | Hazelton | 428/35 |

FOREIGN PATENT DOCUMENTS 58-101135 7/1983 Japan .

Primary Examiner—Edith L. Buffalow
Attorney, Agent, or Firm—Robert A. Stenzel

[57] ABSTRACT

Compositions of matter, sheet material, and packages made therefrom. Novel compositions of polypropylene and high density polyethylene are useful as sealant materials for flexible sheet material structures wherein the sheet material is sealable to a preformed container, to form a lid therefor, and is peelable therefrom, with cohesive failure of the sealant layer in the area of the formed seal. The novel sealant layer compositions provided for package closure and sealing which is capable of withstanding retort conditions while maintaining the integrity of the package closure and seal. Concurrently the lid is readily peeled from the package to provide access to the interior of the package. The peelability comprises cohesive failure of the sealant material in a novel blend of a polypropylene polymer with an ethylene polymer having a density of at least 0.940. The novel sealant materials of the invention can be used on a variety of multiple layer sheet material substructures, and particularly those providing barrier properties to food type packaging: especially barrier to the transmission of oxygen and moisture. Typical barrier materials are metal foil, vinylidene chloride copolymer, vinyl alcohol copolymer, olefin polymers and copolymers, and combinations of the above materials.

25 Claims, 3 Drawing Sheets

PEELABLE PACKAGING AND SHEET MATERIALS AND COMPOSITIONS FOR USE THEREIN

This application is a continuation of application Ser. No. 07/206,077, filed Jun. 13, 1988, now abandoned, which in turn is a division of application Ser. No. 045,003, filed Apr. 30, 1987, now U.S. Pat. No. 4,937,139.

BACKGROUND OF THE INVENTION

It pertains more particularly to packaging which comprises a generally rigid formed tray and a generally more flexible sheet material adhered to the tray to form a closing and sealing lid. In such packages, the packages typically open by peeling the lid away from the formed tray.

The use of formed trays and peelable lids for those trays has, in general, been known for some time. For example, jellies, jams, and dressings are commonly packages in individual servings for institutional use in formed trays with peelable sheet material used for lids sealed to the trays. More recently, larger trays and accompanying lids have been used in the packaging of complete servings of prepared food, or individually packaged complete meals. Other uses for such packaging can, of course, be found.

This invention pertains most particularly to those packages which are to be subjected to relatively severe processing conditions either at the point where the package is being filled and sealed or at the point where the package and/or its contents is to be used. Such packaging typically encounters substantial heat at the point where the package is filled and sealed, and may be subjected to significant heat at the point where the package is used. At the point of end use, the package may be reheated. At the point of packaging, the package may be subjected to, for example, hot filled product at approximately 190° F. Processing at the point of packaging may also include processing of the package at, for example, 250° F. or more.

To the extent packaging can be designed which will withstand such processing and use conditions at the point of packaging and/or the point of use, these packages find substantial applications, particularly in the packaging of food products.

In the packaging of food products it is known to provide, in the packaging, certain materials which will protect the contained food products from the permeation of substances into the package from the outside environment. Substances which can have undersirable affects on the contained product are, for example, oxygen, moisture, contaminants, and light. It is especially important, in some applications, to desirably protect the package contents from oxygen, moisture, and light, in addition to typical containing and protecting functions common to most packaging.

Sheet materials for providing these desired protective properties are known and available, and are commonly used in some applications of packaging materials. For example, moisture penetration may be prevented by the use of certain of the olefin polymers such as the polyethylenes, ethylene copolymers, and polypropylenes. These are only exemplary of the known moisture barrier materials. Oxygen penetration can be successfully impeded through the use of various of the vinylidene chloride copolymers, the amide polymers, and the vinyl alcohol polymers.

Light penetration may be prevented by the use of, for example, metal foils, papers, and pigmented polymers.

It should be understood that the description herein of the various ways of preventing the entrance of unwanted factors from the outside environment is only indicative of the conventional art. The recitation herein is not seen to be, and is not intended to be, exhaustive, but rather is exemplary of the existing technology.

As used herein the word "polymer" generally refers to homopolymers and copolymers unless otherwise specifically stated.

A particular problem is encountered in providing packaging for the severe process conditions of, for example, retort processing or the end use environments, in that there are only a limited number of packaging materials which can be used to provide the combined properties of (i) barrier functions, (ii) the ability to survive the severe processing and use conditions, (iii) safety for use in the packaging of food, and (iv) holding the package closed and containing the product.

Of special concern is providing a heat sealable layer on the exterior surface of the flexible sheet material which forms the lid of the package, and which can be heat sealed to, for example, the peripheral flange of the tray and subsequently be removed with a moderate amount of force. The lid cannot, however, be so loosely sealed to the tray that it is inadvertently or otherwise undesirably released from the tray prior to an intentional opening of the package. Thus are there the requirements to be able to seal the package tightly closed in combination with providing a readily openable package. The closure must provide the necessary protection from the outside environment while the package is intended to be closed. The package should be susceptible to being opened with a moderate amount of force by a smooth and constant pulling. The opening should be smooth and steady when a constant opening force is applied, such that no jorky motions or sudden releases of adhesion are encountered. Susceptibility to leaking through the seal area is unacceptable.

It is well known, particularly from the technological work done on retort packaging, that polypropylene is useful as a sealant material where a high temperature environment is contemplated, such as retort processing. Applicants are aware of the use of sheet materials which employ polypropylene and propylene ethylene copolymers as the sealant layer in tray lids. A problem with using polypropylene or its copolymers as the sealant material is that the peel force required to remove the lid from the tray is excessively high. This problem has been recognized in the industry and certain modifications of the polypropylene have been made in attempts to reduce the high level of adhesion between the polypropylene sealant layer and the flange of the tray. In one case, ethylene vinyl acetate (EVA) has been added to the polypropylene in a quantity estimated at 3 to 5 percent by weight. Japanese Patent Open number 77465; 1982 teaches a blend of a propylene ethylene copolymer, a high density polyethylene, and EVA. That document teaches that polypropylene and high density polyethylene have no compatibility, and need the addition of the ethylene vinyl acetate.

Japanese patent open 1672; 1983 teaches a blend of polypropylene and polyethylene as the sealant layer. The polyethylene is defined as having a density below 0.935.

Another reference which teaches blending of material into polypropylene is U.S. Pat. No. 4,189,519 Ticknor, which teaches the blending of an ethylene ester copolymer into the polybutylene to modify its peel properties.

U.S. Pat. No. 4,183,845 teaches blends of polypropylene and polystyrene as a coating composition for use on paperboard.

It is an object of this invention to provide novel polymeric compositions, novel sheet materials, and novel packaging made from those compositions and sheet materials. The sheet materials in general have the capability to be heat sealed to preformed generally rigid trays, and to withstand retort processing conditions of up to 250 degrees Fahrenheit for approximately 30 minutes. The package may subsequently be opened by peeling of the novel sheet material from the tray, accompanied by cohesive failure of a layer within the sheet material, and wherein the cohesive failure is limited to an area generally confined to that area of the sheet material which functions to form the heat seal about the tray. Thus this invention is not directed at nor concerned with cohesive failures which propagate to areas of the package lid which do not in general form a portion of the seal between the sheet material and the remainder of the package such as the tray.

It is a specific object of the invention to provide novel compositions of matter which are two component blends of polyethylene having a density of at least 0.940 and propylene polymers, either homopolymers or copolymers.

It is another specific objective of the invention to provide novel sheet materials, using as a layer thereof, novel blends of high density polyethylene and polypropylene polymer.

It is yet another specific object of the invention to provide novel packaging made from the sheet materials of the invention, the packaging having retort processing capability in combination with peelable seals whose peeling is accompanied by cohesive failure of one of the layers of the sheet material, the layer exhibiting the cohesive failure being a blend of high density polyethylene and a propylene polymer.

SUMMARY OF THE INVENTION

Certain of the objects of the invention are attained in a composition of matter which is a polymeric blend consisting essentially of 65% to 95% by weight of a propylene polymer and conversely 35% to 5% of an ethylene polymer having a density of at least 0.940.

One preferred family of the blend compositions consists essentially of 85% to 95% by weight of the propylene polymer and 15% to 5% of the ethylene polymer. In this family the propylene polymer comprises a copolymer of 75 to 85 mole percent propylene and conversely 25 to 15 mole percent ethylene.

Another preferred family of the blend compositions of the invention consists essentially of 65% to 75% by weight of the propylene polymer and conversely 35% to 25% by weight of the ethylene polymer. In this family of compositions the propylene polymer comprises a copolymer of about 95 to 98 mole percent propylene and conversely about 5 to 2 mole percent ethylene.

Others of the objectives of the invention are seen in a multiple layer sheet material comprising a first layer of a blend of a propylene polymer and an ethylene polymer having a density of at least about 0.940, a second layer of an adhesive promoting material, and a third layer of a barrier material selected from the group consisting of metal foil, vinylidene chloride copolymer, vinyl alcohol copolymer, ethylene polymers, and propylene polymers.

In one preferred family of these films there is a layer of adhesive, preferably a propylene polymer, between the first and second layers.

In another family of these sheet materials there is a layer of a propylene polymer on the one surface of the first layer which is on the opposite side of the first layer from the second layer. The sheet material may comprise both the adhesive layer between the first and second layers and the propylene layer which is on the other side of the blend layer from the second layer.

The combination of the first blend layer and the one or two of the above recited layers on either surface of the blend layer comprises in general that portion of the sheet material which participates most actively in the formation of the heat seal between the sheet material and the tray. Thus, those layers are referred to singly and in combination herein as the "sealant layer".

The family of sealant layers of this invention is seen to have application for use with a substantial variety of sheet material substructures, which substructures provide other desirable properties for the package.

In one such substructure, the second layer is a primer comprising a carboxy modified olefin polymer, the third layer is metal foil, and a fourth layer of adhesive joins the third layer to an abuse resistant layer.

In another such substructure, the second layer is a catalyzed urethane adhesive, the third layer is metal foil, and a fourth layer of adhesive joins the third layer to an abuse resistant layer.

In yet another substructure, the second layer is either a carboxy modified olefin polymer, or a catalyzed urethane adhesive or primer; the third layer is a vinylidene chloride copolymer, and the fourth layer of an adhesive joins the third layer to an abuse resistant layer.

In still another substructure, the second layer is carboxy modified olefin polymer, the third layer is a vinyl alcohol copolymer, and a fourth layer of carboxy modified olefin polymer adhesive joins the third layer to an abuse resistant layer. In another application which is closely related, layers of amide polymer are interposed on either side of the vinyl alcohol copolymer between the vinyl alcohol copolymer and the respective adhesive layers. In either case, the second and fourth adhesive layers can alternatively be conventional laminating-type adhesives such as catalyzed urethane adhesives.

The blends of propylene polymer and high density polyethylene recited as the novel compositions herein are, in general, useful in the sheet materials of the invention. Specifically, the blend compositions are 65% to 95% by weight of the propylene polymer and 35% to 5% of the high density ethylene polymer. Where the propylene polymer contains a higher amount of ethylene, such as over 15 mole percent, it is preferred that the blend ratio be in the range of 85% to 95% of the propylene polymer and 15% to 5% by weight of the ethylene polymer. Copolymers of propylene and ethylene comprising about 75 to about 95 mole percent propylene and conversely about 25 to 5 mole percent ethylene are typically block copolymers. The copolymers used in this invention which contain the higher amounts of ethylene are typically, though not necessarily, block copolymers. The more preferred of the higher ethylene content copolymers are 75 to 85 mole percent propylene and 25 to 15 mole percent ethylene.

Where the propylene polymer contains a lesser amount of ethylene, it is preferred that the blend composition be 65% to 75% by weight of the propylene polymer and 35% to 25% of the ethylene polymer. Copolymers of polypropylene and ethylene comprising at least about 95 mole percent propylene and conversely no more than about 5 mole percent ethylene are typically random copolymers. The copolymers used in this invention which contain the lesser amounts of ethylene are typically, though not necessarily, random copolymers.

The sheet materials of the invention can be used particularly advantageously as heat sealable lid sheet material for covering formed trays, and for forming seals to the formed trays to form and seal the packages. The seals are formed by the sealant layer, thus joining the sheet material to the formed trays in closing and sealing the packages.

In packages made with sheet material of the invention the lid is peelable from the surface to which it is sealed within the context that the lid peels away from that surface by means of cohesive failure of the sealant material in that area of the lid which forms the seals.

DETAILED DESCRIPTION OF THE ILLUSTRATED EMBODIMENTS

Figure 1:
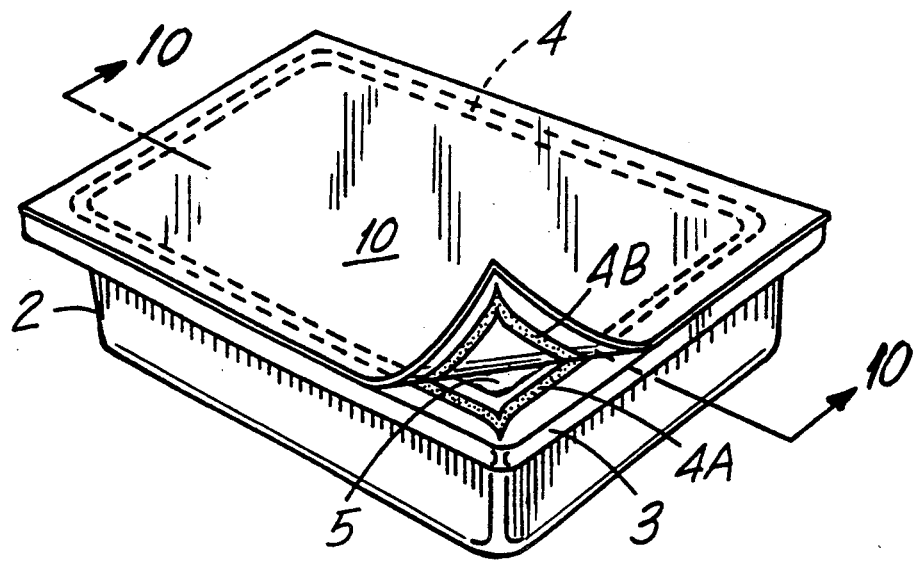
FIG. 1 is a pictorial view of a package made with compositions and sheet materials of the invention, showing the package with the lid partially peeled open.

The invention is illustrated in FIG. 1 as a package comprising a tray 2 having an outwardly directed flange 3 surrounding its open top, and a multiple layer sheet material 10 sealed to the flange 3 of tray 2 at seal area 4 to thereby provide a closure to the open top of the tray. The pattern of seal 4 is so selected as to provide a closing and sealing function to the package when the seal is fabricated. Access to the interior portion 5 of the package is then desirably obtained by removing the lid as by peeling it off the package—and, in the process, breaking the seal and removing the entire cross-section of the lid sheet material from over the opening in the top of the tray.

FIG. 1 illustrates tray 2 having the flange 3 and seal area 4. One corner of the sheet material 10 has been raised and peeled away from flange 3 to expose a small portion of the interior 5 of the tray to the outside environment. Continued pulling and peeling is affective to remove the lid entirely from the tray.

As indicated in FIG. 1 the seal area 4 has been separated into two portions 4A and 4B in that portion of the sheet material which has been peeled away from the tray.

Figure 2:
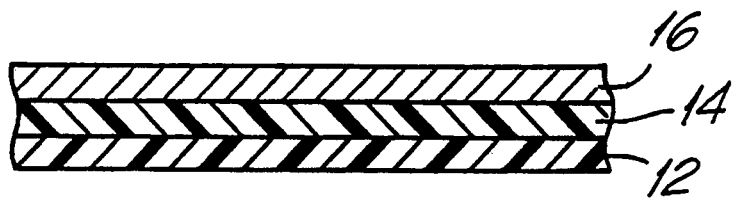
FIG. 2 is a cross-section of the simplest embodiment of the sheet materials of the invention.

FIG. 2 illustrates the simplest embodiments of the sheet materials of the invention. Layer 12 is the sealant layer. Layer 16 is a barrier layer. Layer 14 is an adhesion promoting layer which promotes adhesion of layers 12 and 16 to each other. The composition of layer 12 is a blend of a propylene polymer and an ethylene polymer having a density of at least 0.940. The sealant layer 12 may be used with any of a broad range of subcombinations of other layers for providing the other properties desirable in the sheet material. Thus, it will be seen hereinafter, that the sealant layer 12 is combined with a plurality of exemplary layer subcombinations to make multiple layer sheet materials having substantially varying properties. In some cases it is combined with layers which provide an oxygen barrier capability. It may be combined with layers which provide a light barrier capability. Similarly it may be combined with layers which provide a moisture barrier capability. It may also be combined with layers which provide a combination of the above, as well as barriers to other gases, liquids, etc.

As seen in FIG. 2, layer 16 represents a broad range of barrier layers, such as metal foil, the vinylidene chloride copolymers, vinyl alcohol copolymers, and olefin polymers. The selection of the composition for layer 16 is limited only by the ability to provide an adhesive promoting material 14 which will provide good adhesion between layers 12 and 16. Additional layers may be provided between layers 12 and 16, especially to assist layer 14 in promotion of the desired adhesion. It is, of course, possible to provide additional layers on that side of layer 16 which forms the apparent exterior surface of the sheet material in FIG. 2, opposite layer 12. As will be clearly seen from the following teaching, layer 16, in combination with such additional layers when used, comprises a substrate to which the sealant layer 12 is mounted.

Reference is now made to the composition of layer 12. In addressing the technical issues surrounding the composition of layer 12, it is seen that heat tolerance and heat stability are critical. For those applications requiring these parameters, propylene polymers are seen to be excellent for tolerating the severe processing conditions. Also, the sealability of propylene polymers to for example, formed trays having a propylene-based surface, is excellent. Unfortunately, to the extent that propylene homopolymer or propylene copolymer is used by itself as the sealant layer 12 for sheet material 10, the adhesion between sealant layer 12 and the flange 3 of the tray, and the cohesive strength of layer 12, are so strong that the ability to open the package is substantially impeded.

The applicants herein above have found a particularly advantageous capability to control the peeling of the sheet material, while providing an acceptably strong seal for protecting the contents on the interior of the package. This capability is achieved by providing a special family of blend compositions of propylene for layer 12.

In general, the composition of layer 12 is a polymeric blend of 65% to 95% by weight of a propylene homopolymer or copolymer and conversely 35% to 5% of an ethylene polymer having a density of at least 0.940, and generally known as a high density polyethylene (HDPE). To the extent the propylene polymer is a homopolymer of a copolymer containing up to about 5% ethylene, the larger fractions of HDPE are preferred in the blend composition, up to about 30% HDPE. To the extent the propylene polymer contains more ethylene, such as containing 20% ethylene and 80% propylene, then smaller fractions of HDPE are preferred in the blend composition, such as 10%.

In general, as increasing amounts of propylene are used in the blend, the force required to peel the package open becomes commensurately greater. To the extent that the sheet material 10 has excellent interlayer adhesion and appropriate layer cohesive strengths, these greater peel strengths are acceptable, and thus up to about 90% propylene polymer can be used where the propylene contains up to 5% ethylene. To the extent the interlayer adhesion within sheet material 10 is of a lessor degree, using high amounts of propylene (for example over 80% of a copolymer having 95% or more propylene) can result in delamination within the sheet material 10 when an attempt is made to peel sheet material 10 from the closed and sealed package. Thus where interlayer adhesions are more moderate, it is desirable to use less propylene polymer in the blend, and respectively more polyethylene. Preferred compositions in these embodiments range between 70% and 80% by weight polypropylene and 30% to 20% HDPE. As the fraction of propylene polymer decreases below 70%, the seal strength between layer 12 and flange 3 is reduced to the point where shock resistance of the sealed package is reduced and the preferred seal strength is not achieved.

The adhesion between the layers in sheet material 10 is affected by the tendency of the sheet material to elongate under elongation stresses. It can also be affected by compression of one or more of the layers during the heat sealing process. To the extent the sheet material can be elongated, the elongation puts stresses on the interfaces between the several layers, as each of the differing individual layers responds to the stress according to the properties of its composition. This tends to weaken the adhesion at those respective interfaces. Layer compression has a similar affect, in applying lateral and longitudinal stresses at the layer interfaces. Thus those sheet structures 10 which can be elongated, or undergo significant compression during heat sealing, generally work best when they are combined with a layer 12 which comprises a blend of propylene and ethylene polymers in the lower end of the range of propylene, wherein the lid can be peeled off with more modest forces. On the other hand, since higher fractions of propylene do yield packages having stronger seals and stronger cohesion on layer 12, higher fractions of propylene are preferred where their use can be tolerated. Thus, the amount of propylene in the blend of layer 12 is generally in the higher end of the range for those sheet materials which have a stabilizing layer such as paper or metal foil.

The amount of the HDPE used in the blend of layer 12 is preferably selected with reference to the nature of the propylene polymer which is contemplated for use in the blend and the adhesive and cohesive strengths in and between the several layers in the sheet material. A relatively larger amount of HDPE is used in the blend where the propylene content of the propylene polymer is in the upper portion of its range. To the extent the amount of propylene in the copolymer is lessened, lesser amounts of HDPE are used in the blend. In most cases, the propylene polymer is a copolymer having at least a small amount of ethylene, i.e. 2%, in its composition. Amounts of up to about 5% ethylene are generally considered as random copolymers. As the amount of ethylene in the copolymer is increased over 5%, the structure of the polymer usually becomes more like that of a block copolymer and the material takes on the amorphous characteristics of a block copolymer. There is of course, the common knowledge within the industry that there is a transition range between approximately 5% ethylene and approximately 10% ethylene wherein the properties of the resulting copolymer may primarily be those of the random copolymer or those of the block copolymer, depending primarily on the process of forming and recovering the copolymer. Further, the copolymer may exhibit a combination of the properties of both random copolymers and block copolymers.

Applicants herein have tested many compositions for use in layer 12 and have identified two specific compositions for use in layer 12 which compositions are seen to be preferred for those embodiments which are disclosed hereinafter. The specific preferred composition depends on a number of factors. A primary factor in selecting that composition resides in the identification and characteristics of the other layers in the sheet material. For those sheet materials which use a layer of metal foil, it is generallyy preferred that layer 12 comprise 85% to 95% by weight of propylene polymer and conversely 15% to 5% by weight HDPE. The propylene polymer in this case is a copolymer of 75 to 85 percent propylene and conversely 25 to 15 percent etylene.

In those sheet materials 10 which do not include a stabilizing layer such as paper or foil—and herein addressing primarily those sheet materials wherein all the layers are polymeric or adhesives, a preferred composition for layer 12 is 65% to 85% propylene polymer and conversely 35% to 15% ethylene polymer. The most preferred range is about 70% to about 80% propylene polymer and conversely about 30% to about 20% HDPE. In these blend compositions, the propylene polymer is preferably a copolymer of 95 to 98 percent propylene and conversely 5 to 2 percent ethylene.

For purposes of this invention, preferred copolymers having larger fractions of ethylene are those comprising 75% to 85% propylene and conversely 25% to 15% ethylene. Copolymer composition percentages, in all cases herein, are mole percentages.

Figure 3:
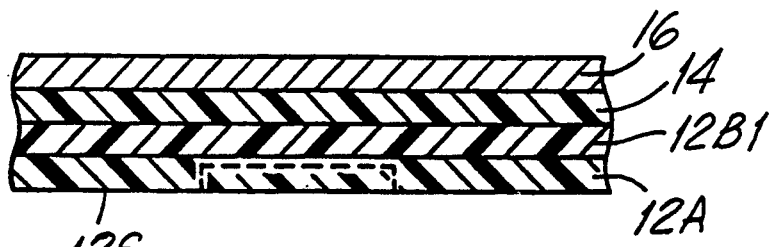
FIGS. 3, 4 and 5 are cross-sections as in FIG. 2 and showing alternate sealant layer constructions.
Figure 4:
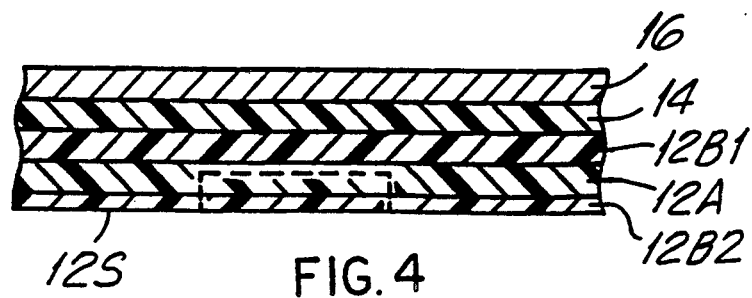
Figure 5:
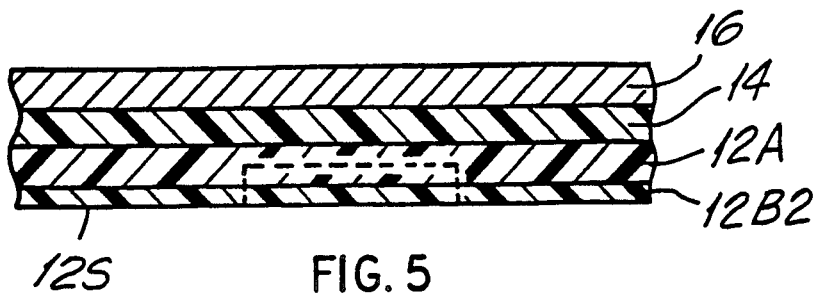

FIGS. 3, 4, and 5 show alternate structure for the sealant layer 12, in which the sealant layer comprises a combination of two or three layers. In all of FIGS. 3, 4, and 5, the blend composition disclosed for FIG. 2 is indicated as layer 12A. Layer 12B1 serves as an adhesive between layer 12A and layers 14 and 16. Layers 12B2 in FIGS. 3, 4, and 5 represents a layer of propylene homopolymer or propylene copolymer, and wherein the propylene copolymer preferably contains a lesser amount of ethylene. Acceptable, but less preferred, material for layer 12B2 is a copolymer of propylene containing a greater amount of ethylene.

As seen in FIG. 3, layer 12B1 is interposed between blend layer 12A and adhesion promoting layer 14. Layer 12B1 in general serves to improve the adhesion of layer 12A to layer 16 through adhesion promoting layer 14. Where layer 14 is a primer such as a carboxy modified olefin polymer and layer 16 is a metal foil, layer 12B1 is preferred to be a propylene polymer and to have lesser amounts of ethylene. In some cases a homopolymer propylene is preferred, to improve the adhesion through layer 14 to foil layer 16. Other adhesive compositions may be used for layer 12B1 so long as they serve the adhesive function. Exemplary materials are catalyzed urethane adhesives and olefin polymers.

FIG. 4 is seen to be a derivative of FIG. 3 in that an additional layer 12B2 has been added to the exterior of the surface of layer 12A to form a covering thereover. Layer 12B2 is, in general, relatively thin.

Referring to FIG. 5, the sealant layer 12 is a combination of blend layer 12A and an exterior covering layer 12B2 corresponding to layer 12B2 in FIG. 4. The difference between FIGS. 4 and 5 is that layer 12B1 of FIG. 4 has been omitted in FIG. 5.

Figure 9:
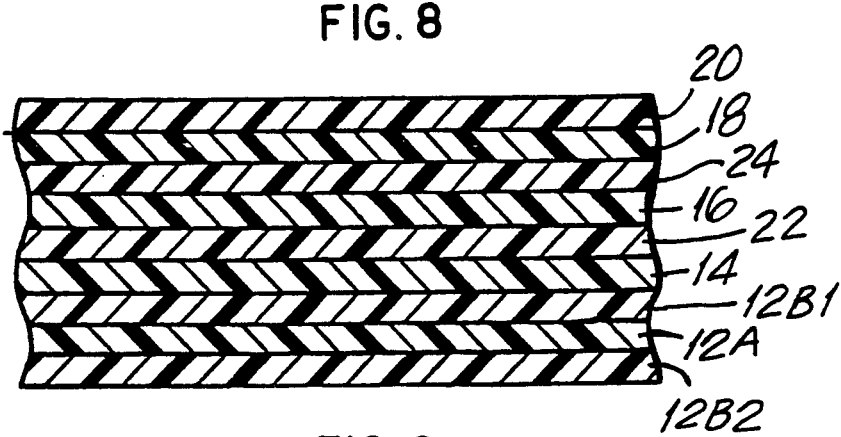
FIG. 9 shows, in cross-section, the detail of the structuring of the layers and sublayers of a more complex sheet material of the invention.

Referring now to the sheet material of FIG. 3, the peeling of the sheet structure 10 of FIG. 3 results in cohesive failure within layer 12A as seen at layer 12 in FIG. 9, and shown in dashed outline in FIG. 3. Referring to the sheet material of FIGS. 4 and 5, the tearing of the sheet material when it is removed from the package comprises (i) a tearing through a layer 12B2 into layer 12A, (ii) cohesive failure within layer 12A and (iii) a tearing back through of layer 12B2 to the outer surface 12-S of the sheet material. The general paths of the preferred propagations are shown in dashed outline in each of FIGS. 3, 4, and 5.

Figure 6:
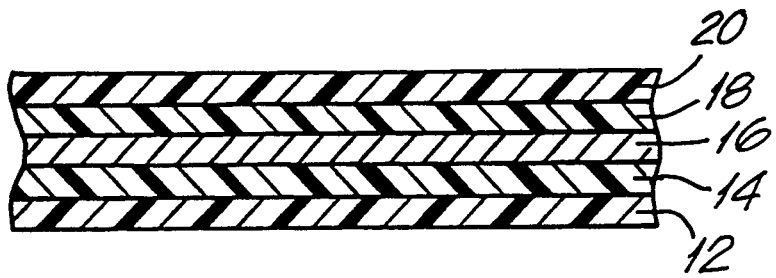
FIGS. 6, 7, and 8 show sheet materials of the invention wherein additional layer substructures are added to the sealant layers as disclosed and described with respect to FIGS. 2-5.
Figure 7:
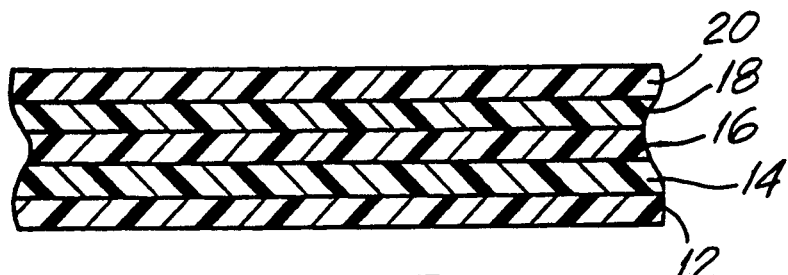
Figure 8:

FIGS. 6, 7, and 8 generally show exemplary sheet structures using the sealant structure of the invention. In all of FIGS. 6, 7, and 8 the sealant layer is shown as a single layer 12. In these structures, the illustrated sealant layer 12 represents all of the sealant layer structures as shown in FIGS. 2-5.

Finally, FIG. 9 shows the sheet structure of FIG. 8 with the more complex three layer sealant material structure combined with it, to indicate the overall complexity of the sheet structures of the invention when using the more complex sealant structure which is seen in FIG. 4.

Returning now to FIG. 5, layer 12 is the sealant layer. Layer 14 is a carboxy modified polypropylene primer. Layer 16 is metal foil. Layer 18 is a conventionally known curing type urethane adhesive. Layer 20 is an abuse resistant layer such as biaxially oriented nylon or polyethylene terephthalate.

In those sheet materials incorporating therein a layer 16 of foil, the preferred composition for layer 12 is (i) 85% to 95% by weight of a copolymer of propylene and ethylene containing 75% to 85% propylene and 25% to 15% ethylene and (ii) 15% to 5% by weight HDPE.

While layer 14 has been indicated as a polyolefin-based primer, preferably polypropylene, an adhesive may be used in place of, or in combination with, the primer layer 14. Exemplary of adhesives which are acceptable, and particularly for use in contact with food products, are the urethane adhesives which are catalyzed with aliphatic type catalyst.

In FIG. 7, layer 12 is the sealant layer. Layer 14 is an adhesive layer. Layer 16 is a vinylidene chloride copolymer. Commercially available vinylidene chloride copolymers are known to be effective oxygen barrier and water vapor barrier materials, and any of the commercially available ones of those polymers are acceptable. Exemplary of those polymers are vinylidene chloridevinyl chloride copolymer and vinylidene chloride-methylacrylate copolymer. Layer 18 is an adhesive. Layer 20 is an abuse resistant material such as biaxially oriented nylon or polyethylene terephthalate. The selection of the composition for adhesive layers 14 and 18 is known to those skilled in the art. In some cases the preferred adhesives are urethane type adhesives. Particularly with respect to layer 14 the adhesive is one which is catalyzed by an aliphatic type catalyst such that the resulting cured adhesive is acceptable for use in a food package. Also acceptable for layer 14 are carboxy modified olefins.

Layers 14 and 18 of FIG. 7 may alternatively be extrudable polymeric materials, in which case layers 14, 16, and 18 may be coextruded, optionally with additional layers in the coextrusion. The combination of the coextruded layers may then be adhesively mounted to layers 12 and 20 through conventional laminating processes, optionally with the use of additional adhesion promoting layers.

In a specific variation on the embodiment represented by FIG. 7, a primer such as a urethane primer is interposed between the vinylidene chloride copolymer of layer 16 and layer 14. Layer 14 is a propylene ethylene copolymer. Formation of the structure includes the process of applying the primer to the surface of the vinylidene chloride copolymer followed by extrusion laminating the primed surface to a pre-formed film of the blend composition of layer 12, using the propylene ethylene composition which forms layer 14 as the extrusion laminant.

In FIG. 8, layer 12 is the sealant layer. Layer 14 is an adhesive layer, preferably a carboxy modified olefin adhesive. Preferred adhesive materials are carboxy modified ethylenes, carboxy modified ethylene vinyl acetates, and carboxy modified propylenes. Exemplary of these materials are the Admers from Mitsui, the CXA polymers for Dupont, and the Plexars available from Chemplex Company. Layer 22 is amide polymer such as nylon. Layer 16 is a vinyl alcohol polymer such as polyvinyl alcohol or ethylene vinyl alcohol copolymer. Layer 24 is an amide polymer such as nylon. Layer 18 is an adhesive such as a urethane curing type adhesive. Layer 20 is an abuse resistant layer such as biaxially oriented nylon or polyethylene terephthalate. In some embodiments of the FIG. 8 structure, layers 22 and 24 may be omitted such that layers 14 and 18 are in direct interfacial contact with barrier layer 16.

Particularly with respect to FIG. 8, the barrier layer 16 may be modified by blending into the vinyl alcohol other materials which enhance its properties. It is known, for example, to blend amide polymers into an ethylene vinyl alcohol composition, with or without plasticizer, in order to improve certain of the physical properties of the ethylene vinyl alcohol. Amide polymers known to be blended into ethylene vinyl alcohol are, for example nylon 6, nylon 66, and nylon copolymers such as the polyether amides. All recitations herein of vinyl alcohol polymer compositions include the blend compositions.

FIG. 9 is a representation of a more complex structure of FIG. 8 wherein the sealant layer 12 is shown as the three layer subcombination of 12A, 12B1, and 12B2 as seen in FIG. 4. FIG. 4 shows the more complex nature of the sealant layer 12 while showing a simplified representation of the other layers 14 and 16. FIG. 8, on the other hand, shows a more complex representation of the layers 14 and 16, wherein the layers 18, 20, and 22 have been added. FIG. 9 shows the combination, then, of FIGS. 4 and 8, wherein both the sealant layer complexity is shown as in FIG. 4 and the nonsealant layer complexity is shown as in FIG. 8. Turning now directly to FIG. 9, layer 12A is the blend composition of the sealant layer. Layer 12B1 is an adhesion promoting material, and is preferably propylene based. Layer 12B2 is a propylene composition. Layer 14 is an adhesive. Layer 22 is an amide polymer. Layer 16 is a vinyl alcohol polymer. Layer 24 is an amide polymer. Layer 18 is a curing urethane adhesive. Layer 20 is the abuse resistant layer such as biaxially oriented nylon or polyethylene terephthalate. In FIG. 9, layers 12A, 12B1, and 12B2 are as represented in FIG. 4. Layers 14, 16, 18, 20, 22, and 24 are as represented in FIG. 8.

Since the most preferred use contemplated for the sheet structures and packages of the invention is in use in retort packages for food products, it is significant to address those test parameters which are required for government acceptance of the package for use with food. While other uses for the packages and sheet materials of the invention are contemplated, and while the requirements for some of those other uses are not as stringent, and thus the abuse testing is less severe, it is desirable herein to address the specific test for the most preferred use. The significant test required by the U.S. Department of Agriculture is an impact test in which the package is dropped on a 15 degree slope from the vertical, from such a height as to impact a barrier, perpendicular to the angle of drop, with 20 inch pounds of impact on the package flange. The test requires dropping the package twice onto adjacent edges. The drop test may acceptably be performed with secondary protective packaging. In testing of preferred embodiments of this invention, secondary protective packaging is not used. The determination of a successful test is based on whether the package leaks or doesn't leak. After the test is complete, those packages which appear to have passed the test are subjected to an internal pressure of 5 psi for 60 seconds under water and observed for escape of contents from the package. In those packages where no material escapes, the package is considered to have passed the test.

Referring now to those sheet structures using metal foil, as in FIG. 6, it is preferred that the sealant layer blend be (i) 85 to 95 percent, most preferably 90%, of a copolymer comprising 75 to 85 percent, most preferably 80% of propylene and conversely 25to 15%, most preferably 20% of ethylene, and (ii) 15% to 5%, most preferably 10%, high density polyethylene. Up to 20% high density polyethylene may be used in the blend with its corresponding preferred minimum of 80% of the propylene copolymer. Where over 20% HDPE is used there is a notable increase in the amount of strings or feathered edges left on the tray flange when the sheet material (comprising the lid) of the tray is peeled off. Between 20% and 30% high density polyethylene can be used with successful opening of the package, albeit with increasing amounts of strings and/or feather edges left on the tray flange by the sheet material. At approximately 30%, and greater amounts, of high density polyethylene, delamination of the sheet material occurs as seen in FIG. 10A along the exemplary lines 26, 27, 31, 33, or 35, leaving all or a portion of layer 12 as a covering on the package; such that the package is not effectively opened. Thus over 30% high density polyethylene in layer 12, blended with a propylene copolymer having over 15% ethylene, for use with a foil based sheet structure is no part of this invention.

Referring now to FIGS. 7–9, and wherein all of the layers are of a polymeric and/or adhesive nature, there are no layers in the sheet material which will prevent substantial elongation of the sheet material when elongation forces are applied. For these families of sheet materials, the composition of the sealant layer blend preferably resists elongation, and comprises 65% to 85%, most preferably 70% to 80% of the propylene polymer and conversely 35% to 15%, most preferably 30% to 20% of the HDPE. In this case the propylene polymer is preferred to have between 2% and 5% ethylene, and most preferably about 4% ethylene. To the extent the fraction of propylene in the blend composition is increased over 85%, the tear propagation on peeling the sheet material away from the tray tends to progress from the inner surface 12-5 through all the layers along lines such as those represented by 31, 33, or 35 in FIG. 10A, to the outer surface of abuse layer 20. To the extent the amount of propylene in the blend composition is less than 70%, adhesion to the flange is insufficient for the closed and sealed package to survive the impact test previously described, without protective secondary packaging. While such packages are thus not preferred for use with food products, they do have acceptable uses for packaging other products and wherein the package performance criteria are less demanding.

Figure 10:
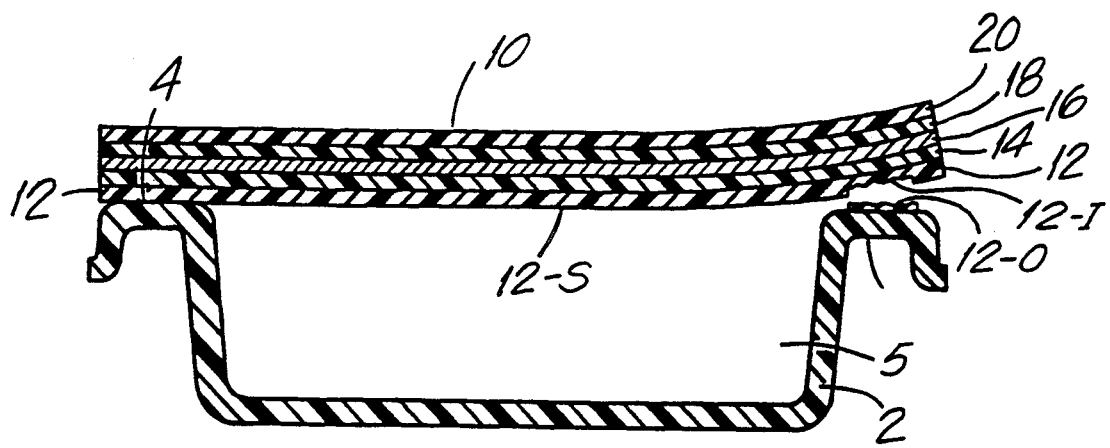
FIG. 10 is a cross-section of a portion of the package of FIG. 1 taken at 10—10 of FIG. 1.
Figure 10A:
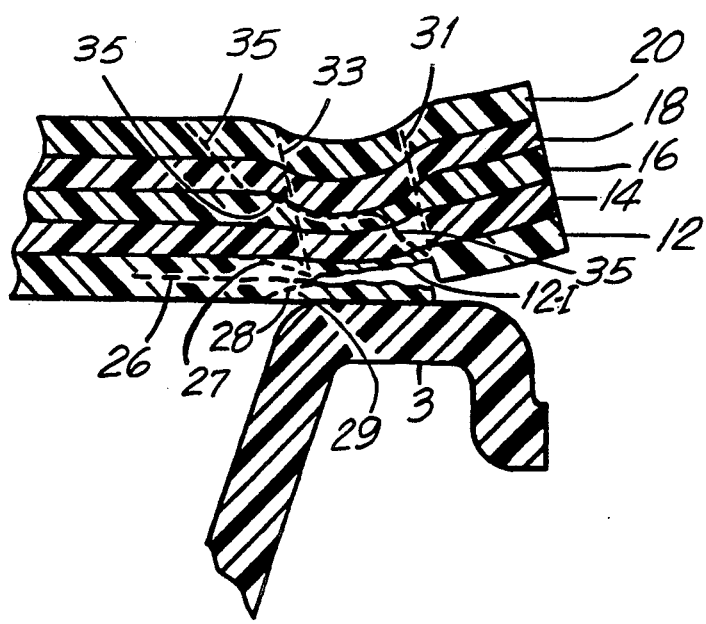
FIG. 10A is a framentary cross-section of a package similar to the package in FIG. 10 and showing, in general, alternate modes of peeling of lid material.

FIG. 10 illustrates in cross-section a portion of the tray of FIG. 1 where the lid sheet material 10 has been peeled slightly away from the flange 3 of tray 2. Referring now to FIG. 10, it is seen that the layer of sheet material 10 which is in closest proximity to flange 3 is layer 12, the sealant layer. It is seen in FIG. 10 that layer 12 provides the contact between the tray 2 and the sheet material 10 at seal area 4. As sheet material 10 is peeled from the tray flange 3 as seen in FIGS. 1 and 10, a tearing occurs in sealant layer 12 at the seal area 4 to provide access to the interior 5 of the container. The peeling of the sheet material 10 away from flange 3 is accompanied by a tearing in layer 12 which comprises a cohesive failure of layer 12 in the area of the seal 4. It is seen that the tearing progresses from the outer surface 12-S of layer 12, across an interior portion of layer 12, and back to the outer surface 12-S of layer 12. Thus the removal of sheet material 10 from the package by way of peeling it from flange 3 results in a separation of layer 12 in the seal area, such that a first portion 12-O of layer 12 remains on the flange 3 and a second portion 12-I of the thickness of layer 12 is removed with the sheet material 10.

It is seen from FIG. 10A that it is critical that the progress of the tearing of layer 12 proceed along the interior of layer 12 across the width of seal 4 and back to the interior surface 12-S of layer 12 in order to gain direct access to the interior of the package. It is specifically critical that the progression of the tear in layer 12 not progress (i) along an extended interior path in layer 12 as at 26 in FIG. 10A or (ii) to the interface of layers 12 and 14 and along that interface across the package, as at 27 in FIG. 10A. To the extent these paths of propagation (26 or 27) of the tear are followed, a portion of the sheet material 10 comprising at least a portion of the thickness of layer 12 remains on the package after the peeling has taken place. As seen in FIG. 10A, a portion of sealant layer 12 remains on the tray covering the opening and preventing access to the contents.

An intermediate and marginally acceptable type of tear is shown at 28 in FIG. 10A wherein the tear propagates along an extended path from the interface of cohesive failure 12-I back toward the surface 12-S of layer 12. The length of extended path 28 determines the amount of material 29 from layer 12 that is left on flange 3 after the removal of the lid. A particular problem addressed in the art of record, and particularly Ticknor, is that conventional peelable sheet materials tend to propagate as shown at 28 in FIG. 10A, and leave a plurality of strings, or feathered edges 29 at the tray flange when the sheet material 10 is peeled away.

A more serious problem occurs when the tear propagates along a path of indeterminate length 26 either in layer 12, at the interface of layers 12 and 14, or at another interior path in sheet material 10. In that event, the access to the tray is not effectively obtained by attempting to peel the sheet material away from the flange 3. To the extent the tear is propagated along a shorter path 28 which eventually terminates at surface 12-S, access is obtained, but with the accompanying presence of undesirable amounts of sealant layer 12 remaining on flange 3 attached to that portion 12-O of layer 12 which remains in the seal area 4 of flange 3. That portion of layer 12 which remains and extends outside the seal area 4 usually looks like a plurality of small strings, or feather edges. These strings and feather edges are undesirable to the extent that they leave an unappealing appearance, an appearance of unsanitary conditions with respect to food, and can provide locations for the breeding of bacteria and the like.

Thus while extended tears as at 28 are marginally acceptable, the clean tear as seen in FIG. 10 is much more desirable, and such propagations of the tear are a particular objective of the preferred embodiments of the invention. To the extent the embodiments of the invention used are the less preferred embodiments, a certain amount of extended tear propagation as at 28 may be encountered.

In some embodiments of the invention, the process of forming the seals at 4 between sheet material 10 and flange 3 of tray 2 has a significant affect on the opening peel characteristics. Refering now especially to FIG. 7, it has been observed that layer 16 of vinylidene chloride copolymer tends to be significantly thinner after formation of seal 4 than before formation of the seal. For purposes of illustration, layer 16 in FIG. 10A has been shown as polymeric; and the substantial thinning of layer 16 is seen at the seal area. The seal area herein includes the entire thickness of sheet material 10 which overlies the area of bonding which exists between layer 12 and flange 3. The process of forming seal 4 includes the combined application of heat and pressure over the area that becomes seal 4, so some reduction in thickness is generally experienced by all the layers. The degree of reduction, however, of the vinylidene chloride copolymer of layer 16 is greater than the reduction of the other layers. To the extent this reduction in thickness occurs, the sheet material has an increased tendency for propagation of the tear from surface 12-I along a path toward and through all the layers to the outer surface of layer 20. These paths are represented in FIG. 10A by dashed lines 31 and 33 which tear more or less directly through the sheet material, and by line 35 which tears to an interface of layer 16, along the interface for a distance, and from there to the outer surface of layer 20.

The occurrence of the above phenomenon is believed to be related to the thermal fluid flow properties of the vinylidene chloride copolymer, combined with the thermal conditions of formation of heat seal area 4. The vinylidene chloride copolymer becomes somewhat fluid at about 230° F. The composition of layer 12, however, requires a temperature of about 320° F. in order to form a strong heat seal at 4. So the conditions which provide for formation of a strong seal have a tendency to heat layer 16 to such a temperature that its thickness is easily reduced.

The instant problem is attenuated, and can be overcome, by applying a uniform heat and pressure throughout the seal area during the formation of the seal 4, and applying that minimum amount of heat and pressure which is required to form a strong seal, without compressing the sheet material in such a way or to such a degree as to cause tear propagation along lines 31, 33, 35, or similar lines.

To the extent the sheet material 10 conforms to the sheet structure of FIG. 6, and to the extent the adhesion promoting layer 14 is a primer, the layer 12 composition is preferred to be a coating grade propylene copolymer which must be less than about 1.5 mil, preferably less than 1 mil, and most preferably about 0.35 to 0.75 mil in thickness, with an ideal thickness being approximately 0.5 mil. To the extent the thickness of layer 12 is optimized, the peeling will be enhanced. To the extent the thickness of layer 12 deviates from the preferred thicknesses, the peel will not be as clean as the peel of a comparable film which uses a more preferred thickness for the blend composition of layer 12.

In those sheet structures using pre-formed films of the blend compositions of layer 12, there is an existing process limitation in that it is difficult to form an unsupported film of these compositions with a thickness less than 1 mil. Thus a 1 mil thickness is a preferred lower limit for the thickness of the blend composition of layer 12 in those films. Thinner films may be made by coextrusion of the layer 12 composition with supporting layers which are later stripped away. While such processes are more expensive, a thinner layer is effectively formed thereby. Up to 1.5 mils thickness may be used for layer 12, although the ease of peeling of the sheet material 10 from tray 2 is impeded as the thickness is increased. To the extent equipment and processes are available to fabricate films thinner than 1 mil, thickness of as little as 0.5 mil is preferred.

Referring back now to FIGS. 3-5, layer 12B1 serves as an adhesive layer and its thickness is typically only great enough to form a uniform and acceptable adhesive, preferably on the order of 0.1 to 0.3 mils. Layer 12B2 serves as an outer covering for the sheet structure. It is important that layer 12B2 be thin enough that it can be easily torn through to reach layer 12A in which cohesive failure and propagation occurs to break the seal when the sheet material is removed from the closed and sealed package. Thus layer 12B2 is generally quite thin, on the order of less than 0.5 mil, preferably less than 0.3 mil.

The combination of layers 12A, 12B1, and 12B2 may conveniently be formed as a coextrusion, in which case the thickest portion of that subcombination will normally be layer 12A. In the FIG. 4 structure, layer 12A is preferably about 05 to 1.0 mil thick, with layers 12B1 and 12B2 both being on the order on 0.5 mil or less, preferably less than 0.3 mil. In a typical structure of FIG. 4, layer 12A is 0.5 mil thick, and layers 12B1 and 12B2 are approximately 0.25 mil thick. While layer 12B1 may be thicker, in some embodiments up to 0.5 to 1 mil. Layer 12B2 is necessarily thin so that it can be easily torn through to reach layer 12A with the propagating tear. To the extent layer 14 is a primer such as a carboxy modified olefin, it is usually of insignificant thickness and is invisible for most purposes. To the extent layer 14 is an adhesive layer, its thickness is generally 0.1 to 1.0 mil, preferably 0.1 to 0.3 mil, depending on whether it is a pre-formed film, an extrusion laminate, or an extrusion coating resin.

The thickness of layer 16 depends on the material being used for layer 16. To the extent it is metal foil it preferably has a thickness of 35 gauge to 200 gauge, most preferably 100 to 200 gauge. When layer 16 is a vinylidene chloride copolymer, the thickness of that layer is preferably approximately 1.0–2.0 mils. Where the barrier layer 16 is a vinyl alcohol, its preferred thickness is typically on the order of 0.5 to 1.0 mil.

The overall thickness of sheet materials of this invention ranges from a low of about 2 mils to a high of about 30 mils, with a preferred thickness of about 2.5 mils to about 12 mils, most preferably about 3 to about 7 mils.

Another type of barrier material which may be used for layer 16, either alone or in combination with others of the barrier materials, is the family of polyolefins, such as polypropylene or polyethylene, which are used as moisture barriers. For example it is common to combine a moisture barrier of high density polyethylene into the same film with a vinylidene chloride copolymer or an ethylene vinyl alcohol copolymer which serve as oxygen barriers. Methods for combining polyolefins and oxygen barriers into the same film with the use of compatible adhesives are known in the art.

For purposes of this invention, blends of polypropylene and polyethylene in layer 12A have functional properties essentially equivalent to those of propylene ethylene copolymers.

Thus it is seen that the invention provides novel compositions in the blend layer 12, and particularly 12A. Novel sheet materials are provided as indicated in FIGS. 2–9. Novel packages are provided as indicated in the combination of the sheet structures of FIGS. 2–9 and the packages illustrated in FIGS. 1, 10, and 10A. The resulting packages exhibit improved capability to protect a product, through processes exhibiting high thermal stresses, and to provide, in combination, the capability for the sheet structure to be peeled away from the package cleanly, in such a way as to provide complete and open access to the contents of the package.

Having thus described the invention, what is claimed is:

1. A closed and sealed package comprising a receptacle having a sealing surface for sealing a closure thereto, and a closure sealed to said sealing surface said closure comprising:
 a. a substrate selected from the group consisting essentially of metal foils, vinyl alcohol copolymers, vinylidene chloride copolymers and olefinic polymers having a surface; and
 b. a first layer on said surface of said substrate, said first layer consisting essentially of a blend of polypropylene and an ethylene polymer having a density of at least 0.940; said first layer of said closure being sealed to said sealing surface of said receptacle such that when said closure is peeled away from said sealing surface a tearing occurs in said first layer at the seal area to provide access to the interior of said receptacle.

2. A closed and sealed package as in claim 1, said closure comprising a multiple layer sheet material, said multiple layer sheet material including a second layer of an adhesive between said substrate and said first layer, said closure being peelable from said sealing surface by cohesive failure of said first layer on peeling of said closure from said receptacle.

3. A closed and sealed package as in claim 1, said closure comprising a multiple layer sheet material, said multiple layer sheet material including a second layer of a propylene polymer, said first layer being between said substrate and said second layer, said closure being peelable from said sealing surface by cohesive failure of said first layer on peeling of said closure from said receptacle.

4. A closed and sealed package as in claim 2, said sheet material including a third layer of a propylene polymer on one surface of said first layer opposite said substrate.

5. A closed and sealed package as in claim 1, said closure being peelable from said sealing surface by cohesive failure of said first layer on peeling of said closure from said receptacle.

6. A closed and sealed package as in claim 5, including a layer of a carboxy modified olefin primer between said substrate and said first layer, and wherein said substrate is metal foil.

7. A closed and sealed package as in claim 5 and including a layer of a catalyzed urethane adhesive between said substrate and said first layer.

8. A closed and sealed package as in claim 5, including, between said substrate and said first layer, an adhesive promoting layer selected from the group consisting of carboxy modified olefin polymers and catalyzed urethane adhesive, and wherein the composition of said substrate is selected from the group consisting of vinylidene chloride copolymers and vinyl alcohol copolymers.

9. A closed and sealed package as in claim 5, including an adhesive promoting layer between said substrate and said first layer, said adhesion promoting layer comprising a urethane-based primer, said substrate comprising a vinylidene chloride copolymer, and including a layer of propylene ethylene copolymer between said substrate and said first layer.

10. A closed and sealed package as in claim 8 wherein said first layer comprises 65% to 95% by weight of said propylene polymer and 35% to 5% by weight of said ethylene polymer.

11. A closed and sealed package comprising a receptacle having a sealing surface for sealing a closure thereto, and a closure sealed to said sealing surface, said closure comprising:
 (a) a substrate having a surface; and
 (b) a first layer on said surface of said substrate, said first layer comprising 65% to 95% by weight of a propylene polymer, and 35% to 5% by weight of an ethylene polymer having a density of at least 0.940,
said first layer of said closure being sealed to said sealing surface of said receptacle.

12. A closed and sealed package as in claim 11 said closure comprising a multiple layer sheet material, said multiple layer sheet material including a second layer of an adhesive between said substrate and said first layer, said closure being peelable from said sealing surface by cohesive failure of said first layer on peeling of said closure from said receptacle.

13. A closed and sealed package as in claim 11, said closure comprising a multiple layer sheet material, said multiple layer sheet material including a second layer of a propylene polymer, said first layer being between said substrate and said second layer, said closure being peelable from said sealing surface by cohesive failure of said first layer on peeling of said closure from said receptacle.

14. A closed and sealed package as in claim 12, said sheet material including a layer of a propylene polymer on one surface of said first layer opposite said substrate.

15. A closed and sealed package as in claim 11, said closure being peelable from said sealing surface by cohesive failure of said first layer on peeling of said closure from said receptacle.

16. A closed and sealed package as in claim 15, including a layer of a carboxy modified olefin primer between said substrate and said first layer, and wherein said substrate is metal foil.

17. A closed and sealed package as in claim 15, and including a layer of a catalyzed urethane adhesive between said substrate and said first layer.

18. A closed and sealed package as in claim 15, including, between said substrate and said first layer, and adhesion promoting layer selected from the group consisting of carboxy modified olefin polymers and catalyzed urethane adhesives, and wherein the composition of said substrate is selected from the group consisting of vinylidene chloride copolymers and vinyl alcohol copolymers.

19. A closed and sealed package as in any one of claims 6, 7, 16 or 17 wherein said first layer comprises 85% to 95% by weight of said propylene polymer and 15% to 5% by weight of said ethylene polymer, said propylene polymer comprising a copolymer of 75 to 85 mole percent propylene and 25 to 15 mole percent ethylene.

20. A closed and sealed package as in claim 15 including a layer of an adhesion promoting material between said substrate and said first layer, said adhesion promoting material comprising a urethane-based primer, said substrate comprising a vinylidene chloride copolymer, and including a layer of propylene ethylene copolymer between said first layer and said substrate.

21. A closed and sealed package as in any one of claims 8, 18 or 20 wherein said first layer comprises 65% to 75% by weight of said propylene polymer and 35% to 25% by weight of said ethylene polymer, said propylene polymer comprising at least 95 mole percent propylene and no more than 5 mole percent ethylene.

22. A closed and sealed package comprising a receptacle having a sealing surface for sealing a closure thereto, and a closure sealed to said sealing surface, said closure comprising:
(a) a substrate selected from the group contisting essentially of metal foils, vinyl alcohol copolymers vinylidine chloride copolymers and olefinic polymers;
(b) a first layer comprising a blend of a propylene polymer and an ethylene polymer having a density of at least 0.940, said first layer being susceptible to cohesive failure, and having a first surface disposed toward said substrate and a second surface disposed away from said substrate; and
(c) a second layer, said second layer comprising a propylene polymer disposed between said second surface of said first layer and said sealing surface, said closure being peelable from said sealing surface by peeling of said closure from said receptacle including by means of (i) failure through said second layer to said first layer and (ii) by cohesive failure of said first layer, by which access is provided to interior of said receptacle.

23. A closed and sealed package as in claim 22, said closure comprising a multiple layer sheet material, said sheet material including a layer of an adhesive promoting material between said sealant layer and said substrate, and an adhesive layer between said sealant layer and said adhesion promoting material.

24. A closed and sealed package comprising a receptacle having a sealing surface for sealing a closure thereto, and a closure sealed to said sealing surface, said closure comprising:
(a) a substrate comprising a metal foil;
(b) a sealant layer comprising a blend of a propylene polymer and an ethylene polymer having a density of at least 0.940, said sealant layer having a first surface disposed toward said substrate; and
(c) an adhesive promoting layer bonded to said first surface of said sealant layer, the composition of said adhesion promoting layer being selected from the group consisting of carboxy modified polyolefins and catalyzed urethane adhesives.

25. A closed sealed package comprising a receptacle having a sealing surface for sealing a closure thereto, and a closure sealed to said sealing surface, said closure comprising:
(a) a substrate having a surface, the composition of said substrate being selected from the group consisting of vinylidene chloride copolymers and vinyl alcohol copolymers;
(b) a sealant layer comprising a blend of a propylene polymer and an ethylene polymer having a density of at least 0.940, said sealant layer having a first surface disposed toward said substrate; and
(c) an adhesion promoting layer bonded to said first surface of said sealant layer, the composition of said adhesion promoting layer being selected from the group consisting of carboxy modified olefin polymers and catalyzed urethane adhesives said sealant layer of said closure being sealed to said sealing surface of said receptacle, such that when said closure is peeled away from said sealing surface a tearing occurs in said sealant layer at the seal area to provide access to the interior of said receptacle.

* * * * *